(12) United States Patent
Shakhnovich

(10) Patent No.: US 6,410,620 B2
(45) Date of Patent: Jun. 25, 2002

(54) COLOR STABLE COMPOSITIONS CONTAINING ARYLATE-COMPRISING POLYMERS

(75) Inventor: Alexander Isaakovich Shakhnovich, Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/815,328

(22) Filed: Mar. 22, 2001

Related U.S. Application Data

(60) Continuation-in-part of application No. 09/709,987, filed on Nov. 13, 2000, now abandoned, which is a division of application No. 09/394,211, filed on Sep. 10, 1999, now abandoned.

(51) Int. Cl.$^7$ .......................... C08K 5/17; C08K 5/3412
(52) U.S. Cl. .......................... 524/89; 524/99; 524/240; 524/254; 528/288; 528/289
(58) Field of Search ........................... 524/89, 99, 240, 524/254; 528/288, 289

(56) References Cited

U.S. PATENT DOCUMENTS

| | | | |
|---|---|---|---|
| 4,493,915 A | | 1/1985 | Lohmeijer |
| 4,539,386 A | * | 9/1985 | Yoon |
| 5,275,903 A | * | 1/1994 | Sundararajan et al. |
| 5,478,878 A | | 12/1995 | Nagaoka et al. |

FOREIGN PATENT DOCUMENTS

| | | |
|---|---|---|
| EP | 0 153 089 | 8/1985 |
| WO | WO 86/04904 | 8/1986 |
| WO | WO 96/15184 | 5/1996 |
| WO | WO 00/15718 | 3/2000 |
| WO | WO 00/61664 | 10/2000 |
| WO | WO 00/69945 | 11/2000 |

* cited by examiner

*Primary Examiner*—Tae H. Yoon
(74) *Attorney, Agent, or Firm*—S. Bruce Brown; Noreen C. Johnson

(57) ABSTRACT

The color stability of thermoplastic polymers comprising structural units derived from at least one 1,3-dihydroxybenzene and at least one organodicarboxylic acid is enhanced by combination with at least one photobleachable 4-aminocinnamic compound such as 4-dimethylaminocinnamaldehyde. The latter absorbs radiation in the range between about 360 nanometers and about 390 nanometers, balancing the radiation absorbed by hydroxybenzophenone moieties formed in the polymer.

50 Claims, No Drawings

COLOR STABLE COMPOSITIONS CONTAINING ARYLATE-COMPRISING POLYMERS

CROSS-REFERENCE TO RELATED APPLICATIONS

This application is a continuation-in-part of U.S. application Ser. No. 09/709,987, filed Nov. 13, 2000, now abandoned, which is a Division of U.S. application Ser. No. 09/394,211, filed Sep. 10, 1999, now abandoned, which is incorporated herein by reference.

BACKGROUND OF THE INVENTION

This invention relates to color stability, and more particularly to improvement of the color stability of compositions containing arylate-comprising polymers.

Photoyellowing of polymers over time is a known phenomenon which is undesirable for aesthetic reasons. It is generally the result of absorption of ultraviolet (UV) radiation by the polymer, said radiation causing photochemical reactions which typically form yellow materials. Such base polymers as polycarbonates are particularly sensitive to photoyellowing. This can severely impede the fabrication of light-colored articles such as white or blue articles, since the yellowing tendency can obliterate the white or blue coloring with the passage of time. Alternatively, a higher proportion of the desired colorant can be introduced during fabrication but there will still be a change in appearance over time.

A recent development which can minimize photoyellowing is the use of a polymer comprising arylate structural units, for example one with structural units derived from resorcinol and a mixture of isophthalic and terephthalic acids, which may be blended with a base polymer, may form a copolymer therewith or may constitute a separate, external layer thereover. Such polyarylates undergo a Fries rearrangement to form hydroxybenzophenone moieties, which serve as ultraviolet absorbers and protect the base polymer from photoyellowing.

However, the polyarylates themselves may develop a yellow color with the passage of time, dissipating to at least some extent the benefits of UV absorption. This is because, while they absorb primarily in the range between about 360 nanometers and about 390 nanometers (nm) in the near ultraviolet portion of the spectrum, their absorption extends a small distance into the visible area, resulting in the yellow color development.

One known method of compensating for color development is to introduce into the polymer a photobleachable compound which absorbs in the same region of the spectrum as the hydroxybenzophenone moieties. Yellow dyes generally absorb in this range. Such a dye, if photobleachable, turns colorless at approximately the same rate as that of photoyellowing and the overall color of the polymer remains fairly constant. This method is disclosed in various patents, of which examples in the polyphenylene ether art include U.S. Pat. Nos. 4,493,915 and 5,478,878.

However, the absorption of most photobleachable yellow dyes continues into the range between about 400 nanometers and about 450 nanometers in the visible region of the spectrum, farther than that of the hydroxybenzophenone moieties. This means that their presence initially introduces a yellow tinge of greater intensity than that produced as hydroxybenzophenone moieties are formed. Under such conditions it is at best difficult, and at worst impossible, to produce light colored articles with consistent coloration over the passage of time. New methods for color suppression continue to be sought in the art.

SUMMARY OF THE INVENTION

The present invention is based on the discovery that color development as the result of the formation of hydroxybenzophenone moieties in arylate-comprising polymers can be suppressed by the addition of photobleachable compounds having absorption limited, within the near ultraviolet and visible portions of the spectrum, to the aforementioned region of between about 360 nm and about 390 nm. It has further been discovered that aminocinnamic compounds have such absorption properties.

Accordingly, in one embodiment the invention is a resinous composition comprising the following:

(A) at least one thermoplastic polymer comprising structural units derived from at least one 1,3-dihydroxybenzene and at least one organodicarboxylic acid, and (B) at least one 4-aminocinnamic compound of the formula

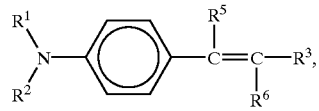

wherein:
each of $R^1$ and $R^2$ is an alkyl radical, or $R^1$ and $R^2$ together with the nitrogen atom separating them form a heterocyclic radical;
$R^3$ is $COOR^4$, $C(O)R^4$, or CN;
$R^4$ is hydrogen, alkyl or aryl; and
each of $R^5$ and $R^6$ is hydrogen, alkyl, or aryl; or $R^5$ and $R^6$ together with the carbon atoms connecting them form an alicyclic radical;
said 4-aminocinnamic compound absorbing radiation in the range between about 360 nanometers and about 390 nanometers.

In another embodiment the invention is a resinous composition comprising the following:

(A) at least one thermoplastic polymer comprising structural units derived from at least one 1,3-dihydroxybenzene and at least one organodicarboxylic acid, and (B) at least one 4-aminocinnamic compound of the formula

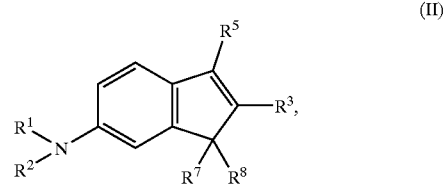

(II)

wherein:
each of $R^1$ and $R^2$ is an alkyl radical, or $R^1$ and $R^2$ together with the nitrogen atom separating them form a heterocyclic radical;
$R^3$ is $COOR^4$, $C(O)R^4$, or CN;
$R^4$ is hydrogen, alkyl or aryl;
$R^5$ is hydrogen, alkyl, or aryl; and
each of $R^7$ and $R^8$ is hydrogen or an alkyl radical, or $R^7$ and $R^8$ together form an alicyclic radical;

said 4-aminocinnamic compound absorbing radiation in the range between about 360 nanometers and about 390 nanometers.

In another embodiment the invention is a resinous composition comprising the following and any reaction products thereof:

(A) at least one thermoplastic polymer comprising structural units derived from at least one 1,3-dihydroxybenzene and at least one organodicarboxylic acid, and (B) at least one 4-aminocinnamic compound of the formula

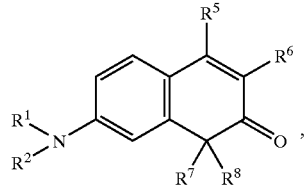

(III)

wherein:
each of $R^1$ and $R^2$ is an alkyl radical, or $R^1$ and $R^2$ together with the nitrogen atom separating them form a heterocyclic radical;
each of $R^5$ and $R^6$ is hydrogen, alkyl, or aryl; or $R^5$ and $R^6$ together with the carbon atoms connecting them form an alicyclic radical; and
each of $R^7$ and $R^8$ is hydrogen or an alkyl radical, or $R^7$ and $R^8$ together form an alicyclic radical;
said 4-aminocinnamnic compound absorbing radiation in the range between about 360 nanometers and about 390 nanometers.

DETAILED DESCRIPTION; PREFERRED EMBODIMENTS

For the sake of brevity, the constituents of the compositions of this invention are defined as "components" irrespective of whether a reaction between said constituents occurs at any time. Thus, the compositions may include said components and any reaction products thereof.

Component A in the compositions of the invention is a thermoplastic polymer comprising structural units derived from at least one 1,3-dihydroxybenzene and at least one organodicarboxylic acid. Suitable polymers for this purpose, specifically arylate-comprising polymers, are disclosed for example in commonly owned U.S. Pat. No. 5,916,997, the disclosure of which is incorporated by reference herein. Arylate-comprising polymers having a glass transition temperature of at least about 80° C. and no crystalline melting temperature, i.e., those that are amorphous, are preferred.

In one embodiment the polymer comprising a polyarylate is one with structural units derived from a 1,3-dihydroxybenzene and either isophthalic acid or terephthalic acid or a mixture thereof comprising structural units of the formula

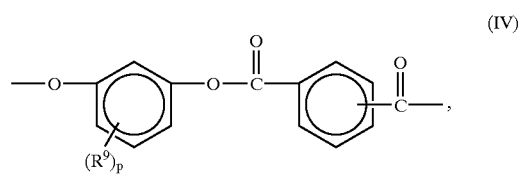

(IV)

wherein each $R^9$ is a substituent, especially halo or $C_{1-12}$ alkyl, and p is 0–3, optionally in combination with structural units of the formula

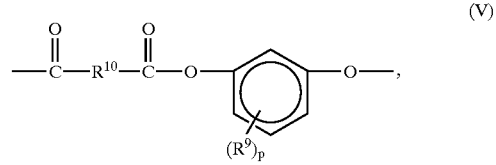

(V)

wherein $R^9$ and p are as previously defined and $R^{10}$ is a divalent $C_{3-22}$ aliphatic, alicyclic or mixed aliphatic-alicyclic radical. Moieties represented by $R^{10}$ are often referred to as "soft block" units.

It is within the scope of the invention for other acid groups, such as those derived from aliphatic dicarboxylic acids such as succinic acid, adipic acid or cyclohexane-1,4-dicarboxylic acid, or from other aromatic dicarboxylic acids such as 2,6-naphthalenedicarboxylic acid, to be present, preferably in amounts no greater than about 30 mole percent. Most typically, however, component A may consist of units of formula IV, optionally in combination with units of formula V.

The units of formula IV contain a resorcinol or substituted resorcinol moiety in which any $R^9$ groups are preferably $C_{1-4}$ alkyl; i.e., methyl, ethyl, propyl or butyl. They are preferably primary or secondary groups, with methyl being more preferred. The most preferred moieties are resorcinol moieties, in which p is zero, although moieties in which p is 1 are also excellent with respect to the invention.

Said 1,3-dihydroxybenzene moieties are bound to one or more types of organodicarboxylic acid moieties, typically aromatic organodicarboxylic acid moieties which may be monocyclic, e.g., isophthalate or terephthalate, or polycyclic, e.g., naphthalenedicarboxylate. Preferably, the aromatic dicarboxylic acid moieties are isophthalate or terephthalate or a mixture thereof. Either or both of said moieties may be present. For the most part, both are present in a molar ratio of isophthalate to terephthalate in the range of between about 0.25:1 and about 4.0:1, preferably in the range of between about 0.4:1 and about 2.5:1, more preferably in the range of between about 0.67:1 and about 1.5:1, and most preferably in the range of between about 0.9:1 and about 1.1:1.

In the optional soft block units of formula V, resorcinol or substituted resorcinol moieties are again present in ester-forming combination with $R^{10}$ which is a divalent $C_{3-22}$ aliphatic, alicyclic or mixed aliphatic-alicyclic radical. Preferably, $R^{10}$ is a $C_{3-22}$ straight chain alkylene, $C_{3-12}$ branched alkylene, or $C_{4-12}$ cyclo- or bicycloalkylene group. More preferably, $R^{10}$ is aliphatic and especially $C_{8-12}$ straight chain aliphatic.

It is usually found that the arylate-comprising polymers most easily prepared, especially by interfacial methods, consist of units of formula IV and especially structural units derived from resorcinol in combination with structural units derived from isophthalic acid and terephthalic acid units (sometimes referred to herein as resorcinol isophthalate/ terephthalate) in a molar ratio in the range of between about 0.25:1 and about 4.0:1, preferably in the range of between about 0.4:1 and about 2.5:1, more preferably in the range of between about 0.67:1 and about 1.5:1, and most preferably in the range of between about 0.9:1 and about 1.1:1. When that is the case, the presence of soft block units of formula V is usually unnecessary. If the ratio of units of formula IV is outside this range, and especially when they are exclusively iso- or terephthalate, the presence of soft block units may be preferred to facilitate interfacial preparation. A particularly preferred arylate-comprising polymer containing soft block units is one consisting essentially of resorcinol isophthalate and resorcinol sebacate units in a molar ratio in the range of between about 8.5:1.5 and about 9.5:0.5.

Arylate-comprising polymers useful as component A may be prepared by conventional esterification reactions which may be conducted interfacially, in solution, in the melt or under solid state conditions, all of which are known in the art. Typical interfacial preparation conditions are described for example in commonly owned U.S. Pat. No. 5,916,997, the disclosure of which is incorporated by reference herein.

Also useful as component A are the block copolyestercarbonates disclosed and claimed in copending, commonly owned applications Ser. Nos. 09/368,706 and 09/416,529, the disclosures of which are also incorporated by reference herein. They include block copolymers comprising polyarylate structural units derived from a 1,3-dihydroxybenzene and either isophthalic acid or terephthalic acid or a mixture thereof in combination with carbonate structural units and having the formula

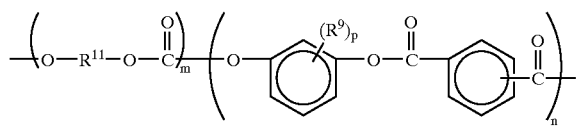

(VI)

wherein $R^9$ and p are as previously defined, each $R^{11}$ is independently a divalent organic radical, m is at least 1 and n is at least about 4. Preferably n is at least about 10, more preferably at least about 20 and most preferably about 30–150. Preferably m is at least about 3, more preferably at least about 10 and most preferably about 20–200. In especially preferred embodiments m is between about 20 and 50.

The arylate blocks contain structural units comprising 1,3-dihydroxybenzene moieties which may be unsubstituted or substituted. Alkyl substituents, if present, are preferably straight-chain or branched alkyl groups, and are most often located in the ortho position to both oxygen atoms although other ring locations are contemplated. Suitable $C_{1-12}$ alkyl groups include methyl, ethyl, n-propyl, isopropyl, butyl, iso-butyl, t-butyl, nonyl, decyl, and aryl-substituted alkyl, including benzyl, with methyl being particularly preferred. Suitable halogen substituents are bromo, chloro, and fluoro. 1,3-Dihydroxybenzene moieties containing a mixture of alkyl and halogen substituents are also suitable. The value for p may be 0–3, preferably 0–2, and more preferably 0–1. A preferred 1,3-dihydroxybenzene moiety is 2-methylresorcinol. The most preferred 1,3-dihydroxybenzene moiety is unsubstituted resorcinol in which p is zero. Polymers containing mixtures of 1,3-dihydroxybenzene moieties, such as a mixture of unsubstituted resorcinol with 2-methylresorcinol are also contemplated.

In the arylate structural units said 1,3-dihydroxybenzene moieties are bound to aromatic dicarboxylic acid moieties which may be monocyclic moieties, such as isophthalate or terephthalate or their chlorine-substituted derivatives; or polycyclic moieties, such as biphenyl dicarboxylate, diphenylether dicarboxylate, diphenylsulfone dicarboxylate, diphenylketone dicarboxylate, diphenylsulfide dicarboxylate, or naphthalenedicarboxylate, preferably naphthalene-2,6-dicarboxylate; or mixtures of monocyclic and/or polycyclic aromatic dicarboxylates. Preferably, the aromatic dicarboxylic acid moieties are isophthalate and/or terephthalate. Either or both of said moieties may be present. For the most part, both are present in a molar ratio of isophthalate to terephthalate in the range of between about 0.25:1 and about 4.0:1. When the isophthalate to terephthalate ratio is greater than about 4.0:1, then unacceptable levels of cyclic oligomer may form. When the isophthalate to terephthalate ratio is less than about 0.25:1, then unacceptable levels of insoluble polymer may form. Preferably the molar ratio of isophthalate to terephthalate is in a range of between about 0.4:1 and about 2.5:1, and more preferably in a range between about 0.67:1 and about 1.5:1. m is at least about 10 and n is at least about 4. Soft block moieties corresponding to formula V may also be present.

In the organic carbonate blocks, each $R^{11}$ is independently a divalent organic radical. Preferably, said radical comprises at least one dihydroxy-substituted aromatic hydrocarbon, and at least about 60 percent of the total number of $R^{11}$ groups in the polymer are aromatic organic radicals and the balance thereof are aliphatic, alicyclic, or aromatic radicals. Suitable $R^{11}$ radicals include m-phenylene, p-phenylene, 4,4'-biphenylene, 4,4'-bi(3,5-dimethyl)-phenylene, 2,2-bis (4-phenylene)propane, 6,6'-(3,3,3',3'-tetramethyl-1,1'-spirobi[1H-indan]) and similar radicals such as those which correspond to the dihydroxy-substituted aromatic hydrocarbons disclosed by name or formula (generic or specific) in U.S. Pat. No. 4,217,438, which is incorporated herein by reference. A particularly preferred divalent organic radical is 2,2-bis(p-phenylene)isopropylidene and the dihydroxysubstituted aromatic hydrocarbon corresponding thereto is commonly known as bisphenol A.

It is believed that the arylate-comprising polymers of component A undergo thermally or photochemically induced Fries rearrangement of arylate blocks to yield o-hydroxybenzophenone moieties or analogs thereof which serve as stabilizers to UV radiation. More particularly, at least a portion of arylate chain members can rearrange to yield chain members with at least one hydroxy group ortho to at least one ketone group. Such rearranged chain members are typically o-hydroxybenzophenone-type chain members and typically comprise one or more of the following structural moieties:

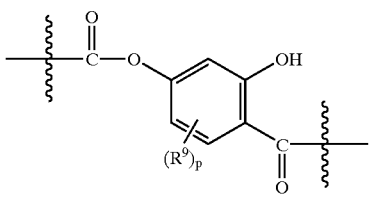

(VII)

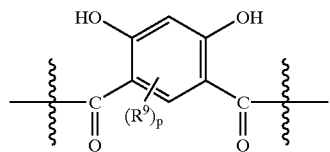

(VIII)

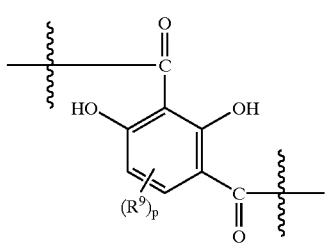

wherein $R^9$ and p are as previously defined. Thus, in one of its embodiments compositions of the present invention comprise arylate-comprising polymers, at least a portion of which structural units have undergone Fries rearrangement. Fries rearrangement typically gives polymer with structural units represented by a combination of Formulas X and XI,

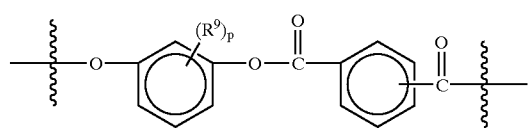

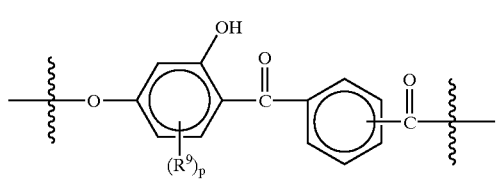

wherein $R^9$ and p are as previously defined and wherein the molar ratio of structural units represented by Formula X to structural units represented by Formula XI is in the range of between about 99:1 and about 1:1, and preferably in the range of between about 99:1 and about 80:20. Although iso- and terephthalate units are illustrated in Formulas X and XI, the dicarboxylic acid residues in the arylate residues may be derived from any suitable dicarboxylic acid residue, as defined hereinabove, or mixture of suitable dicarboxylic acid residues. In preferred embodiments p in both Formulas X and XI is zero and the arylate blocks comprise dicarboxylic acid residues derived from a mixture of iso- and terephthalic acid residues. It is also contemplated to introduce moieties of the types illustrated in Formulas VII, VIII, and IX via synthesis and polymerization of appropriate monomers in arylate-comprising polymers.

In a further embodiment the present invention comprises compositions containing copolyestercarbonates containing structural units comprising those shown in Formula XII wherein $R^9$, $R^{11}$, p, m, and n are as previously defined:

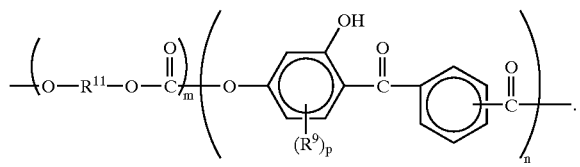

Component B is at least one 4-aminocinnamic compound of formula I, II, or III. In said compounds, $R^1$ and $R^2$ may each be alkyl or may, together with the connecting nitrogen atom, be a heterocyclic radical such as pyrrolyl or piperidinyl. Most often, each of $R^1$ and $R^2$ is $C_{1-4}$ alkyl, especially methyl.

In said compounds the $R^3$ radical, when present, may be $COOR^4$, $C(O)R^4$, or CN. Preferably $R^3$ is $C(O)R^4$. $R^4$ may be hydrogen, alkyl, aryl or substituted aryl. Most often, $R^4$ is hydrogen or $C_{1-4}$ alkyl.

In said compounds each of $R^5$ and $R^6$, when present, may be one of the designated radicals. Most often, each of $R^5$ and $R^6$ is hydrogen. It should also be noted that, although the configuration of formula I might suggest that $R^5$ and $R^6$ are in the trans configuration, the use of both cis and trans compounds is within the scope of the invention.

In said compounds each of $R^7$ and $R^8$, when present, may independently be hydrogen or an alkyl radical. Alkyl radicals are typically $C_{1-4}$, straight- or branched-chain, and preferably methyl. Alternatively, $R^7$ and $R^8$ may be joined together to form an alicyclic radical, preferably a five-membered or six-membered ring. Most often, each of $R^7$ and $R^8$, when present, is hydrogen.

Numerous compounds of formulas I, II, and III are available or can be prepared by the methods described in the literature. For example, compounds of formula I may be prepared by the reaction of a suitable aminobenzaldehyde with a suitable methyl ketone.

A feature of component B is its capability of absorbing radiation in the range between about 360 nanometers and about 390 nanometers. In fact, the compounds of formula I have an absorption maximum in this range but do not absorb a substantial proportion of radiation in the lowest region of the visible spectrum; i.e., in the range between about 400 nanometers and about 410 nanometers. Thus, it does not initially impart a yellow color to the resinous composition but does, in large part, match the absorption of the hydroxybenzophenone moieties formed in the polyarylate.

As a result, the resinous composition has a high degree of color stability. Moreover, the color properties of any specific composition can be adjusted as necessary, in both wavelength and intensity, by suitable variations in the substituent values on the compounds of formula I, II, or III.

Component B is present in the compositions of the invention in an amount effective to balance color development as a result of the formation of hydroxybenzophenone moieties. In general, this amount will be in the range of between about 50 ppm and about 1,000 ppm by weight based on component A. The exact amount will depend on such factors as the specific resin composition employed and can be readily determined without undue experimentation.

The formation of the compositions of the invention may be effected by art-recognized blending techniques. These include melt blending and solution blending.

The compositions of the invention may be employed for the fabrication of resinous articles having a high degree of light stability. They may also be employed as weatherability improving additives in blends with at least one other polymer, illustrative examples of which include polycarbonates, polyesters, polyetherimides, polyphenylene ethers and addition polymers. Related blends are disclosed in commonly owned U.S. Pat. No. 6,143,839, the disclosure of which is incorporated by reference herein.

In another embodiment the present invention comprises multilayer articles comprising at least two layers. In one embodiment multilayer articles of the invention are those comprising a substrate layer comprising at least one thermoplastic polymer, thermoset polymer, cellulosic material, glass, ceramic, or metal, and at least one coating layer or film thereon, said coating layer or film comprising the composition of the invention, i.e. components A and B. Optionally, the multilayer articles may further comprise an interlayer, for example an adhesive interlayer (sometimes known as a tielayer), between any substrate layer and any polymer coating layer. Within the present context a multilayer article is one which contains two or more layers. Multilayer articles of the invention include, but are not limited to, those which comprise a substrate layer and a coating layer of the composition of the invention; those which comprise a substrate layer with a coating layer of the composition of the invention on each side of said substrate layer; and those which comprise a substrate layer and at least one coating layer of the composition of the invention with at least one interlayer between a substrate layer and a coating layer. Any interlayer may be transparent, translucent, or opaque, and/or may contain an additive, for example a colorant or decorative material such as metal flake. If desired, an overlayer may be included over the coating layer of the composition of the invention, for example to provide abrasion or scratch resistance. The substrate layer, coating layer of the composition of the invention, and any interlayers or overcoating layers are preferably in contiguous superposed contact with one another.

Within the context of the present invention it should be understood that any coating layer comprising a the composition of the invention comprising resorcinol arylate polyester chain members will also include polymer comprising o-hydroxybenzophenone or analogous chain members resulting from Fries rearrangement of said resorcinol arylate chain members, for example after exposure of said coating layer to UV-light. Typically, a preponderance of polymer comprising o-hydroxybenzophenone or analogous chain members will be on that side or sides of said coating layer exposed to UV-light and will overlay in a contiguous superposed layer or layers that polymer comprising unrearranged resorcinol arylate chain members. If it is worn away or otherwise removed, polymer comprising o-hydroxybenzophenone or analogous chain members is capable of regenerating or renewing itself from the resorcinol arylate-containing layer or layers, thus providing continuous protection for any UV-light sensitive layers.

The multilayer articles typically have outstanding initial gloss, improved initial color, weatherability, impact strength, and resistance to organic solvents encountered in their final applications. Said articles may also be recyclable by reason of the compatibility of the discrete layers therein.

The material of the substrate layer in the articles of this invention may be at least one thermoplastic polymer, whether addition or condensation prepared. Condensation polymers include, but are not limited to, polycarbonates, particularly aromatic polycarbonates, polyphenylene ethers, polyetherimides, polyetherketones, polyetheretherketones, polyesters and polyestercarbonates (different from those that may be employed for the coating layer, as defined hereinafter), and polyamides. Polycarbonates and polyesters are frequently preferred.

Suitable polycarbonates include homopolycarbonates comprising structural units of the type described for the organic carbonate blocks in the copolyestercarbonates of the invention. The most preferred polycarbonates are bisphenol A homo- and copolycarbonates. Preferably, the weight average molecular weight of the initial polycarbonate is in the range of between about 5,000 and about 100,000; more preferably, in the range of between about 25,000 and about 65,000.

The polycarbonate substrate may also be a copolyestercarbonate (different from that copolyestercarbonate employed for the coating layer as defined hereinafter). Such copolymers typically comprise, in addition to the organic carbonate units, ester units such as isophthalate and/or terephthalate. Copolyestercarbonates which find use in the instant invention and the methods for their preparation are well known in the art as disclosed in, for example, U.S. Pat. Nos. 3,030,331; 3,169,121; 3,207,814; 4,194,038; 4,156,069; 4,238,596; 4,238,597; 4,487,896; and 4,506,065.

Polyester substrates include, but are not limited to, poly (ethylene terephthalate), poly(1,4-butylene terephthalate), poly(trimethylene terephthalate), poly(ethylene naphthalate), poly(butylene naphthalate), poly (cyclohexanedimethanol terephthalate), poly (cyclohexanedimethanol-co-ethylene terephthalate), and poly(1,4-cyclohexanedimethyl-1,4-cyclohexanedicarboxylate).

Suitable addition polymer substrates include homo- and copolymeric aliphatic olefin and functionalized olefin polymers such as polyethylene, polypropylene, poly(vinyl chloride), poly(vinyl chloride-co-vinylidene chloride), poly (vinyl fluoride), poly(vinylidene fluoride), poly(vinyl acetate), poly(vinyl alcohol), poly(vinyl butyral), poly (acrylonitrile), acrylic polymers such as those of (meth) acrylamides or of alkyl(meth)acrylates such as poly(methyl methacrylate) ("PMMA"), and polymers of alkenylaromatic compounds such as polystyrenes, including syndiotactic polystyrene. The preferred addition polymers for many purposes are polystyrenes and especially the so-called ABS and ASA copolymers, which may contain thermoplastic, non-elastomeric styrene-acrylonitrile side chains grafted on an elastomeric base polymer of butadiene and alkyl acrylate, respectively.

Blends of any of the foregoing types and species of polymers may also be employed as substrates. Typical blends include, but are not limited to, those comprising PC/ABS, PC/ASA, PC/PBT, PC/PET, PC/polyetherimide, PC/polysulfone, polyester/polyetherimide, PMMA/acrylic rubber, polyphenylene ether-polystyrene, polyphenylene ether-polyamide or polyphenylene ether-polyester. Although the substrate layer may incorporate other thermoplastic polymers, the above-described polycarbonates and/or addition polymers still more preferably constitute the major proportion thereof.

The substrate layer in the multilayer articles of this invention may also comprise at least one of any thermoset polymer. Suitable thermoset polymer substrates include, but are not limited to, those derived from epoxys, cyanate esters, unsaturated polyesters, diallylphthalate, acrylics, alkyds, phenol-formaldehyde, novolacs, resoles, bismaleimides, PMR resins, melamine-formaldehyde, urea-formaldehyde, benzocyclobutanes, hydroxymethylfurans, and isocyanates. In one embodiment of the invention the thermoset polymer substrate further comprises at least one thermoplastic polymer, such as, but not limited to, polyphenylene ether, polyphenylene sulfide, polysulfone, polyetherimide, or polyester. Said thermoplastic polymer is typically combined with thermoset monomer mixture before curing of said thermoset. Foamed substrates are also within the scope of the invention.

In one embodiment of the invention a substrate layer (such as but not limited to a thermoplastic or thermoset substrate layer) also incorporates at least one filler and/or pigment. Illustrative extending and reinforcing fillers, and pigments include silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers, carbon fibers, and metal fibers, as well as colorants such as metal flakes, glass flakes and beads, ceramic particles, other polymer particles, dyes and pigments which may be organic, inorganic or organometallic. In another embodiment the invention encompasses multilayer articles comprising a filled thermoset substrate layer such as a sheet-molding compound (SMC) or bulk molding compound (BMC).

The substrate layer may also comprise at least one cellulosic material including, but not limited to, wood, paper, cardboard, fiber board, particle board, plywood, construction paper, Kraft paper, cellulose nitrate, cellulose acetate butyrate, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

Multilayer articles encompassed by the invention also include those comprising at least one glass layer. Typically any glass layer is a substrate layer, although multilayer articles comprising a coating layer of the composition of the invention interposed between a glass layer and a substrate layer are also contemplated. Depending upon the nature of coating and glass layers, at least one adhesive interlayer may be beneficially employed between any glass layer and any coating layer of the composition of the invention. The adhesive interlayer may be transparent, opaque or translucent. For many applications it is preferred that the interlayer be optically transparent in nature and generally have a transmission of greater than about 60% and a haze value less than about 3% with no objectionable color.

Metal articles exposed to UV-light may exhibit tarnishing and other detrimental phenomena. In another embodiment the invention encompasses multilayer articles comprising at least one metal layer as substrate layer. Representative metal substrates include those comprising brass, aluminum, magnesium, chrome, iron, steel, copper, and other metals or alloys or articles containing them, which may require protection from UV-light or other weather phenomena. Depending upon the nature of coating and metal layers, at least one adhesive interlayer may be beneficially employed between any metal layer and any coating layer of the composition of the invention.

Also present in the articles of the invention is at least one coating layer or film comprising the composition of the invention. More particularly, suitable coating layers comprise polymers comprising structural units derived from at least one 1,3-dihydroxybenzene and at least one organodicarboxylic acid. Typically, suitable coating layers comprise resorcinol arylate polyesters, copolyesters (particularly those containing soft-blocks), copolyestercarbonates, and mixtures thereof. Copolyestercarbonates, when used in both substrate layer and in coating layer, are typically different from each other in molecular structure. For example, when the coating layer contains copolyestercarbonate with resorcinol arylate polyester blocks, then any ester blocks in a substrate copolyestercarbonate layer will typically be derived from the same divalent organic radical as contained in the carbonate blocks of said substrate.

It is also within the scope of the invention for other polymers to be present which are miscible in at least some proportions with the polymer coating layer comprising polymer comprising structural units derived from at least one 1,3-dihydroxybenzene and at least one organodicarboxylic acid. Illustrative examples of at least partially miscible polymers include polyetherimide and polyesters such as PBT, PET, PTT, PEN, PBN, PETG, PCCD, and bisphenol A polyarylate. Preferably, a coating layer polymer consists essentially the composition of the invention comprising polymer comprising structural units derived from at least one 1,3-dihydroxybenzene and at least one organodicarboxylic acid.

Another aspect of the invention is a method for preparing a multilayer article which comprises applying at least one coating or film layer of the composition of the invention to a second layer, said second layer comprising at least one thermoplastic polymer, thermoset polymer, cellulosic material, glass, or metal, and said coating layer comprising polymer comprising structural units derived from at least one 1,3-dihydroxybenzene and at least one organodicarboxylic acid.

In the method of the invention, at least one thermally stable coating or film layer is applied to a second layer, which may be the substrate layer or at least one intermediate layer ultimately to be disposed between coating and substrate layers. An intermediate layer may generally comprise any of the materials suitable for use as the substrate or coating layer, and may further contain fillers and colorants such as described hereinabove. When necessary, it may be specifically chosen so as to provide good adhesion between substrate and coating layers. Colorants of the previously described types may also be present in the coating layer.

Application of the at least one coating layer may be performed by solvent-casting. More preferably, application of said coating layer comprises fabrication of a separate sheet thereof followed by application to the second layer, or by simultaneous production of both layers, typically in a melt process. Thus, there may be employed such methods as co-injection molding, coextrusion, overmolding, blow molding, multi-shot injection molding and placement of a film of a coating layer material on the surface of a second layer followed by adhesion of the two layers, typically in an injection molding apparatus; e.g., in-mold decoration, or in a hot-press. These operations may be conducted under art-recognized conditions.

It is also within the scope of the invention to apply a structure comprising a coating layer and a second layer to a third, substrate layer, which is generally of a thermoplastic, thermoset, or cellulosic material similar or identical to that of the second layer but different from that of the coating layer. This may be achieved, for example, by charging an injection mold with a structure comprising a coating layer and a second layer and injecting the substrate sheet material behind it. By this method, in-mold decoration and the like are possible. Both sides of the substrate layer may receive the other layers, though it is usually preferred to apply them to only one side.

The thicknesses of the various layers in multilayer articles of this invention are most often as follows:

substrate—at least about 125 $\mu$ (microns), preferably at least about 250 $\mu$, more preferably at least about 400 $\mu$, coating—in the range of between about 2 $\mu$ and about 2,500 $\mu$, preferably in the range of between about 10 $\mu$ and about 250 $\mu$ and most preferably in the range of between about 50 $\mu$ and about 175 $\mu$, second material, if any—in the range of between about 2 $\mu$ and about 2,500 $\mu$, preferably in the range of between about 10 $\mu$ and about 250 $\mu$, and most preferably in the range of between about 50 $\mu$ and about 175 $\mu$, total—at least about 125 µ, preferably at least about 250 µ, more preferably at least about 400 µ.

The articles of this invention are characterized by the usual beneficial properties of the substrate layer, in addition to weatherability as evidenced by improved resistance to ultraviolet radiation and maintenance of gloss, and solvent resistance. Depending upon the coating layer/substrate combination, the multilayer articles may possess recycling capability, which makes it possible to employ the regrind material as a substrate for further production of articles of the invention.

Representative multilayer articles which can be made which comprise the composition of the invention include aircraft, automotive, truck, military vehicle (including automotive, aircraft, and water-borne vehicles), and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

The invention is illustrated by the following non-limiting examples.

EXAMPLE 1

A resorcinol isophthalate/terephthalate bisphenol A carbonate block copolyestercarbonate having a 1:1 molar ratio of carbonate to ester groups and a 1:1 molar ratio of isophthalate to terephthalate groups was prepared and 2 grams (g) thereof was dissolved in 8 milliliters (ml) of chloroform. 4-Dimethylamino-cinnamaldehyde, 700 micrograms (µg), was added to the solution. A 25.4-micron film thereof was cast on a glass surface using a doctor blade and the solvent was evaporated. The film was mounted in a slide holder and exposed in a Ci35A weatherometer (B/B filter, 0.77 watts per square meter [W/m$^2$]).

The color data after various periods of exposure are listed in Table 1. The parameters L*, a* and b* respectively represent the light intensity (100= white light), yellow-blue hue (positive is yellow) and red-green hue (positive is red). The parameter ΔE varies directly with the change in color of the sample and is the square root of the expression $(L^*_1-L^*_0)^2+(a^*_1-a^*_0)^2+(b^*_1-b^*_0)^2$, where $L^*_1$, $a^*_1$ and $b^*_1$ are the values after exposure and $L^*_0$, $a^*_0$ and $b^*_0$ the initial values.

TABLE I

| Exposure, kJ | 0 | 57.8 | 117 | 517 |
| --- | --- | --- | --- | --- |
| L* | 94.61 | 95.14 | 94.96 | 94.94 |
| a* | −1.14 | −0.75 | −0.81 | −1.19 |
| b* | 2.73 | 2.01 | 1.97 | 2.85 |
| ΔE | — | 0.97 | 0.90 | 0.35 |

These results show that there is little change in color properties of the film upon weathering.

EXAMPLE 2

A film identical to that of Example 1 was compression molded at 200° C. on a white bisphenol A polycarbonate plaque and the assemblage was exposed as in Example 1. The results are given in Table II.

TABLE II

| Exposure, kJ | 0 | 57.1 | 114.1 | 173.2 | 231.7 |
| --- | --- | --- | --- | --- | --- |
| L* | 93.67 | 93.93 | 93.96 | 93.94 | 93.89 |
| a* | −3.33 | −3.11 | −3.17 | −3.31 | −3.34 |
| b* | 10.01 | 9.60 | 9.74 | 10.26 | 10.67 |
| ΔE | — | 0.54 | 0.43 | 0.37 | 0.69 |

For comparison, the results in Table III were obtained for a control in which the polyarylate film contained no 4-dimethylaminocinnamaldehyde.

TABLE III

| Exposure, kJ | 0 | 57.4 | 116.7 | 229.7 | 348.2 |
| --- | --- | --- | --- | --- | --- |
| L* | 94.76 | 94.82 | 94.75 | 94.67 | 94.58 |
| a* | −0.49 | −2.94 | −3.15 | −3.45 | −3.57 |
| b* | 3.27 | 8.79 | 9.50 | 10.86 | 11.22 |
| ΔE | — | 6.04 | 6.77 | 8.15 | 8.53 |

It can be seen that the color change for the control was substantially greater than that for the plaque coated with the composition of the invention.

EXAMPLE 3

A film is prepared and exposed in a weatherometer as described in Example 1 except that in place of 4-dimethylaminocinnamaldehyde there is employed an equimolar amount of a compound of the formula (II):

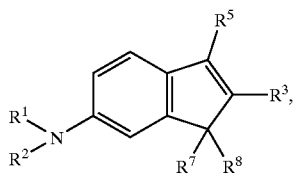

wherein each of $R^1$ and $R^2$ is methyl; $R^3$ is COOEt; $R^5$ is hydrogen; and each of $R^7$ and $R^8$ is hydrogen. The film shows little change in color properties upon weathering compared to a similar film without the compound shown.

EXAMPLE 4

A film containing the compound of Example 3 is prepared and exposed in a weatherometer as described in Example 1 except that in place of a resorcinol isophthalate/terephthalate bisphenol A carbonate block copolyestercarbonate there is employed an arylate-comprising polymer containing soft block units consisting essentially of resorcinol isophthalate and resorcinol sebacate units in a molar ratio between 8.5:1.5 and 9.5:0.5. The film shows little change in color properties upon weathering compared to a similar film without the compound of Example 3.

EXAMPLE 5

A film identical to that of Example 4 is compression molded on a white bisphenol A polycarbonate plaque and the assemblage is exposed in a weatherometer as in Example 1. For comparison, results are also obtained for a control film made without the compound of Example 3. The color change for the control is substantially greater than that for the plaque coated with the composition of the invention.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A resinous composition comprising the following:
   (A) at least one thermoplastic polymer comprising structural units derived from at least one 1,3-dihydroxybenzene and at least one organodicarboxylic acid, and
   (B) at least one 4-aminocinnamic compound of the formula

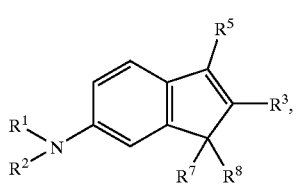

wherein:
   each of $R^1$ and $R^2$ is an alkyl radical, or $R^1$ and $R^2$ together with the nitrogen atom separating them form a heterocyclic radical;
   $R^3$ is $COOR^4$, $C(O)R^4$, or CN;
   $R^4$ is hydrogen, alkyl or aryl;
   $R^5$ is hydrogen, alkyl, or aryl; and
   each of $R^7$ and $R^8$ is hydrogen or an alkyl radical, or $R^7$ and $R^8$ together form an alicyclic radical;
   said 4-aminocinnamic compound absorbing radiation in the range between about 360 nanometers and about 390 nanometers.

2. The composition according to claim 1 wherein component A comprises structural units of the formula

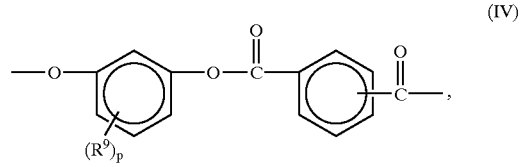

wherein each $R^9$ is a halo or $C_{1-12}$ alkyl substituent and p is 0–3, optionally in combination with structural units of the formula

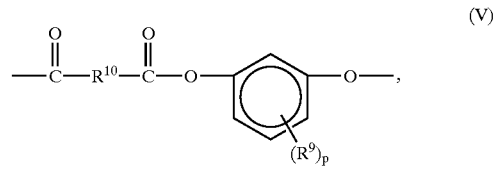

wherein $R^9$ and p are as previously defined and $R^{10}$ is a divalent $C_{4-12}$ aliphatic, alicyclic or mixed aliphatic-alicyclic radical.

3. The composition according to claim 2 wherein component A consists of structural units of formula IV and p is zero.

4. The composition according to claim 3 wherein the structural units are mixed isophthalate/terephthalate units.

5. The composition according to claim 2 wherein component A consists of structural units of formulas IV and V, p is zero and $R^{10}$ is a $C_{8-12}$ straight chain aliphatic radical.

6. The composition according to claim 5 wherein the structural units of formula IV are mixed isophthalate/terephthalate units.

7. The composition according to claim 2 wherein component A is a block copolyestercarbonate comprising structural units of the formula

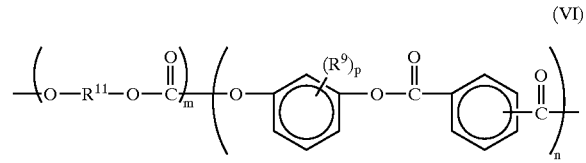

wherein each $R^9$ is a halo or $C_{1-12}$ alkyl substituent, each $R^{11}$ is independently a divalent organic radical, m is at least about 10, n is at least about 4 and p is 0–3.

8. The composition according to claim 7 wherein p is zero and $R^{11}$ is 2,2-bis(p-phenylene)isopropylidene.

9. The composition according to claim 8 wherein the ester units are mixed isophthalate/terephthalate units.

10. The composition according to claim 1 wherein each of $R^1$ and $R^2$ is $C_{1-4}$ alkyl and each of $R^5$, $R^7$, and $R^8$ is hydrogen.

11. The composition according to claim 10 wherein each of $R^1$ and $R^2$ is methyl.

12. The composition according to claim 10 wherein $R^1$ and $R^2$ taken together are piperidinyl.

13. The composition according to claim 10 wherein $R^3$ is $COOR^4$.

14. The composition according to claim 13 wherein $R^4$ is hydrogen.

15. The composition according to claim 13 wherein $R^4$ is $C_{1-4}$ alkyl.

16. The composition according to claim 13 wherein $R^4$ is aryl.

17. The composition according to claim 10 wherein $R^3$ is CN.

18. The composition according to claim 1 wherein component B is present in the range of about 50 ppm and about 1,000 ppm by weight based on component A.

19. A resinous composition comprising the following:

(A) at least one thermoplastic polymer comprising structural units derived from a resorcinol and at least one of isophthalic and terephthalic acids, and (B) an amount in a range of between about 50 ppm and about 1,000 ppm by weight, based on component A, of at least one aminocinnamic compound of the formula

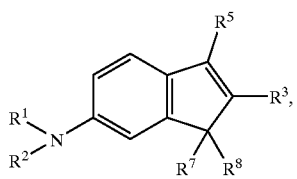

(II)

wherein:
each of $R^1$ and $R^2$ is an alkyl radical, or $R^1$ and $R^2$ together with the nitrogen atom separating them form a heterocyclic radical;
$R^3$ is $COOR^4$, $C(O)R^4$, or CN;
$R^4$ is hydrogen, alkyl or aryl;
$R^5$ is hydrogen, alkyl, or aryl; and
each of $R^7$ and $R^8$ is hydrogen or an alkyl radical, or $R^7$ and $R^8$ together form an alicyclic radical;
said 4-aminocinnamic compound absorbing radiation in the range between about 360 nanometers and about 390 nanometers.

20. The composition of claim 19 in which at least a portion of thermoplastic polymer has undergone Fries rearrangement.

21. A resinous composition comprising the following:

(A) at least one block copolyestercarbonate comprising moieties of the formula

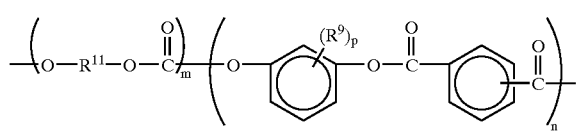

(VI)

wherein $R^9$ is a halo or $C_{1-12}$ alkyl substituent and p is 0–3, each $R^{11}$ is independently a divalent organic radical, m is at least about 10 and n is at least about 4;

(B) an amount in a range of between about 50 ppm and about 1,000 ppm by weight, based on component A, of at least one aminocinnamic compound of the formula

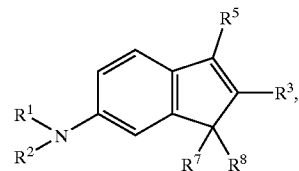

(II)

wherein:
each of $R^1$ and $R^2$ is an alkyl radical, or $R^1$ and $R^2$ together with the nitrogen atom separating them form a heterocyclic radical;
$R^3$ is $COOR^4$, $C(O)R^4$, or CN;
$R^4$ is hydrogen, alkyl or aryl;
$R^5$ is hydrogen, alkyl, or aryl; and
each of $R^7$ and $R^8$ is hydrogen or an alkyl radical, or $R^7$ and $R^8$ together form an alicyclic radical;
said 4-aminocinnamic compound absorbing radiation in the range between about 360 nanometers and about 390 nanometers.

22. The composition of claim 21 in which at least a portion of thermoplastic polymer has undergone Fries rearrangement.

23. A multilayer article with at least one layer comprising the composition of claim 1.

24. The multilayer article of claim 23 which is an aircraft, automotive, truck, military vehicle, military aircraft, water-borne military vehicle, or motorcycle exterior or interior component, a panel, quarter panel, rocker panel, trim, fender, door, decklid, trunklid, hood, bonnet, roof, bumper, fascia, grill, mirror housing, pillar applique, cladding, body side molding, wheel cover, hubcap, door handle, spoiler, window frame, headlamp bezel, headlamp, tail lamp, tail lamp housing, tail lamp bezel, license plate enclosure, roof rack, or running board; an enclosure, housing, panel, or part for an outdoor vehicle or outdoor device; an enclosure for an electrical or telecommunication device; outdoor furniture; an article for boat or marine equipment, trim, enclosures, and housings; an outboard motor housing; a depth finder housing; a personal water-craft; a jet-ski; a pool; a spa; a hot-tub; a step; a step covering; a building or construction application glazing, roofs, windows, floors, decorative window furnishings or treatments; a treated glass cover for pictures, painting, posters, or display items; an optical lens; an ophthalmic lens; a corrective ophthalmic lens; an implantable ophthalmic lens; a wall panel, or door; a protected graphic; an outdoor or indoor sign; an enclosure, housing, panel, or part for automatic teller machines (ATM); an enclosure, housing, panel, or part for lawn or garden tractors, lawn mowers, or tools, lawn and garden tools; a window or door trim; an article of sports equipment or a toy; an enclosure, housing, panel, or part for a snowmobile; a recreational vehicle panel or component; an article of playground equipment; an article made from combinations of plastic and wood; a golf course marker; a utility pit cover; a computer housing; a desk-top computer housing; a portable computer housing; a lap-top computer housing; a palm-held computer housing; a monitor housing; a printer housing; a keyboard; a FAX machine housing; a copier housing; a telephone housing; a mobile phone housing; a radio sender housing; a radio receiver housing; a light fixture; a lighting appliance; a network interface device housing; a transformer housing; an air conditioner housing; an article of cladding or seating for public transportation; an article of cladding or seating for trains, subways, or buses;

a meter housing; an antenna housing; an article of cladding for satellite dishes; a coated helmet or other article of personal protective equipment; a coated synthetic or natural textile; a coated photographic film or photographic print; a coated painted article; a coated dyed article; a coated fluorescent article; or a coated foam article.

25. A multilayer article with at least one layer comprising the composition of claim 19.

26. A multilayer article with at least one layer comprising the composition of claim 20.

27. A multilayer article with at least one layer comprising the composition of claim 21.

28. A multilayer article with at least one layer comprising the composition of claim 22.

29. A method for preparing a resinous composition comprising the following:

(A) at least one thermoplastic polymer comprising structural units derived from at least one 1,3-dihydroxybenzene and at least one organodicarboxylic acid, and (B) at least one 4-aminocinnamic compound of the formula

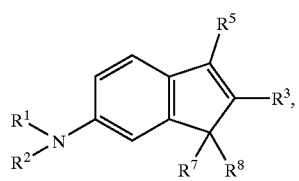

(II)

wherein:

each of $R^1$ and $R^2$ is an alkyl radical, or $R^1$ and $R^2$ together with the nitrogen atom separating them form a heterocyclic radical;

$R^3$ is $COOR^4$, $C(O)R^4$, or CN;

$R^4$ is hydrogen, alkyl or aryl;

$R^5$ is hydrogen, alkyl, or aryl; and each of $R^7$ and $R^8$ is hydrogen or an alkyl radical, or $R^7$ and $R^8$ together form an alicyclic radical;

said 4-aminocinnamic compound absorbing radiation in the range between about 360 nanometers and about 390 nanometers, wherein the method comprises melt blending components (A) and (B).

30. The method according to claim 29 wherein component A comprises structural units of the formula

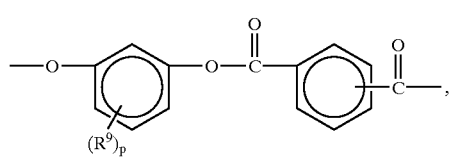

(IV)

wherein each $R^9$ is a halo or $C_{1-12}$ alkyl substituent and p is 0–3, optionally in combination with structural units of the formula

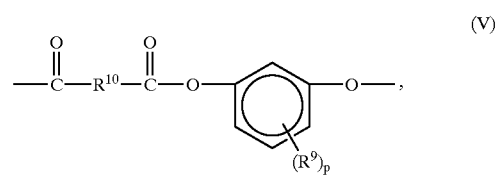

(V)

wherein $R^9$ and p are as previously defined and $R^{10}$ is a divalent $C_{4-12}$ aliphatic, alicyclic or mixed aliphatic-alicyclic radical.

31. The method according to claim 30 wherein component A consists of structural units of formula IV and p is zero.

32. The method according to claim 31 wherein the structural units are mixed isophthalate/terephthalate units.

33. The method according to claim 30 wherein component A consists of structural units of formulas IV and V, p is zero and $R^{10}$ is a $C_{8-12}$ straight chain aliphatic radical.

34. The method according to claim 33 wherein the structural units of formula IV are mixed isophthalate/terephthalate units.

35. The method according to claim 30 wherein component A is a block copolyestercarbonate comprising structural units of the formula

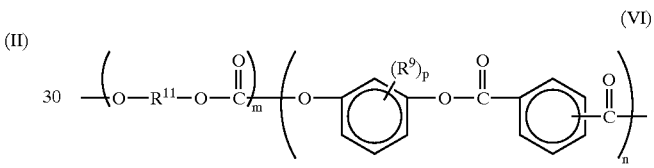

(VI)

wherein each $R^9$ is a halo or $C_{1-12}$ alkyl substituent, each $R^{11}$ is independently a divalent organic radical, m is at least about 10, n is at least about 4 and p is 0–3.

36. The method according to claim 35 wherein p is zero and $R^{11}$ is 2,2-bis(p-phenylene)isopropylidene.

37. The method according to claim 36 wherein the ester units are mixed isophthalate/terephthalate units.

38. The method according to claim 29 wherein each of $R^1$ and $R^2$ is $C_{1-4}$ alkyl and each of $R^5$, $R^7$, and $R^8$ is hydrogen.

39. The method according to claim 37 wherein each of $R^1$ and $R^2$ is methyl.

40. The method according to claim 38 wherein $R^1$ and $R^2$ taken together are piperidinyl.

41. The method according to claim 38 wherein $R^3$ is $COOR^4$.

42. The method according to claim 41 wherein $R^4$ is hydrogen.

43. The method according to claim 41 wherein $R^4$ is $C_{1-4}$ alkyl.

44. The method according to claim 41 wherein $R^4$ is aryl.

45. The method according to claim 38 wherein $R^3$ is CN.

46. The method according to claim 29 wherein component B is present in the range of between about 50 ppm and about 1,000 ppm by weight based on component A.

47. A method for preparing a resinous composition comprising the following:

(A) at least one thermoplastic polymer comprising structural units derived from a resorcinol and at least one of isophthalic and terephthalic acids, and (B) an amount in a range of between about 50 ppm and about 1,000 ppm by weight, based on component A, of at least one aminocinnamic compound of the formula

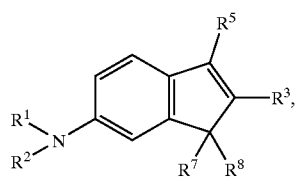

(II)

wherein:
each of $R^1$ and $R^2$ is an alkyl radical, or $R^1$ and $R^2$ together with the nitrogen atom separating them form a heterocyclic radical;
$R^3$ is $COOR^4$, $C(O)R^4$, or CN;
$R^4$ is hydrogen, alkyl or aryl;
$R^5$ is hydrogen, alkyl, or aryl; and
each of $R^7$ and $R^8$ is hydrogen or an alkyl radical, or $R^7$ and $R^8$ together form an alicyclic radical;
said 4-aminocinnamic compound absorbing radiation in the range between about 360 nanometers and about 390 nanometers, wherein the method comprises melt blending components (A) and (B).

48. The method of claim 47 in which at least a portion of thermoplastic polymer has undergone Fries rearrangement.

49. A resinous composition comprising the following:
(A) at least one block copolyestercarbonate comprising moieties of the formula

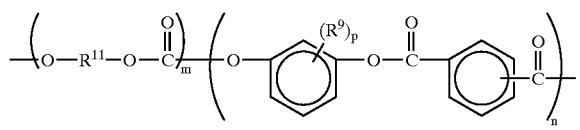

(VI)

wherein $R^9$ is a halo or $C_{1-12}$ alkyl substituent and p is 0–3, each $R^{11}$ is independently a divalent organic radical, m is at least about 10 and n is at least about 4;

(B) an amount in a range of between about 50 ppm and about 1,000 ppm by weight, based on component A, of at least one aminocinnamic compound of the formula

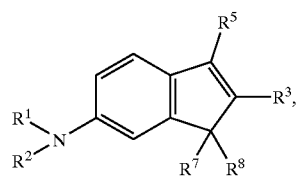

(II)

wherein:
each of $R^1$ and $R^2$ is an alkyl radical, or $R^1$ and $R^2$ together with the nitrogen atom separating them form a heterocyclic radical;
$R^3$ is $COOR^4$, $C(O)R^4$, or CN;
$R^4$ is hydrogen, alkyl or aryl;
$R^5$ is hydrogen, alkyl, or aryl; and
each of $R^7$ and $R^8$ is hydrogen or an alkyl radical, or $R^7$ and $R^8$ together form an alicyclic radical;

said 4-aminocinnamic compound absorbing radiation in the range between about 360 nanometers and about 390 nanometers, wherein the method comprises melt blending components (A) and (B).

50. The composition of claim 49 in which at least a portion of thermoplastic polymer has undergone Fries rearrangement.

* * * * *